(12) United States Patent
Tanaka et al.

(10) Patent No.: US 11,509,392 B2
(45) Date of Patent: Nov. 22, 2022

(54) SIGNAL QUALITY INFORMATION NOTIFICATION METHOD AND RELAY COMMUNICATION APPARATUS

(71) Applicant: NIPPON TELEGRAPH AND TELEPHONE CORPORATION, Tokyo (JP)

(72) Inventors: Takafumi Tanaka, Musashino (JP); Shokei Kobayashi, Musashino (JP); Seiki Kuwabara, Musashino (JP); Yoshiaki Yamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/252,833

(22) PCT Filed: Jun. 5, 2019

(86) PCT No.: PCT/JP2019/022315
§ 371 (c)(1),
(2) Date: Dec. 16, 2020

(87) PCT Pub. No.: WO2019/244633
PCT Pub. Date: Dec. 26, 2019

(65) Prior Publication Data
US 2021/0126707 A1    Apr. 29, 2021

(30) Foreign Application Priority Data

Jun. 21, 2018 (JP) .............................. JP2018-118040

(51) Int. Cl.
*H04B 10/079*    (2013.01)
*H04B 10/29*     (2013.01)
*H04J 3/16*      (2006.01)

(52) U.S. Cl.
CPC ....... *H04B 10/07953* (2013.01); *H04B 10/29* (2013.01); *H04J 3/1652* (2013.01); *H04J 2203/0062* (2013.01)

(58) Field of Classification Search
CPC ........... H04B 10/07–0799; H04B 10/29; H04J 3/1652; H04J 2203/0062
(Continued)

(56) References Cited

U.S. PATENT DOCUMENTS 6,151,148 A * 11/2000 Harano ................ H04B 10/298
398/30
2002/0131115 A1 * 9/2002 Kasahara ............ H04J 14/0241
398/34
(Continued)

FOREIGN PATENT DOCUMENTS

JP        2010258816 A    11/2010

OTHER PUBLICATIONS

Interfaces for the optical transport network, ITU-T G.709/Y.1331, Jun. 2016.
(Continued)

*Primary Examiner* — Li Liu
(74) *Attorney, Agent, or Firm* — Harness, Dickey & Pierce, P.L.C.

(57) ABSTRACT

A communication system transmits relay data through a communication path including a plurality of sections in which different communication schemes are used. A relay communication device is provided between a first section and a second section which are adjacent sections. The relay communication device includes a receiving unit receiving the relay data from the first section through a frame of a first communication scheme, and a relaying unit configuring, in a frame of a second communication scheme used to transmit the relay data to a relay destination, signal quality informa-
(Continued)

tion representing signal quality calculated for a physical link in each of the sections through which the relay data is transmitted before arriving at the relay communication device, and outputting the frame of the second communication scheme to the second section.

19 Claims, 12 Drawing Sheets

(58) Field of Classification Search
USPC .................................. 398/9–18, 140, 141
See application file for complete search history.

(56) References Cited

U.S. PATENT DOCUMENTS

| | | | |
|---|---|---|---|
| 2004/0096215 A1* | 5/2004 | Evangelides, Jr. | H04B 10/075 398/33 |
| 2008/0085125 A1* | 4/2008 | Frankel | H04B 10/25133 398/159 |
| 2009/0103520 A1* | 4/2009 | Begall | H04L 12/66 370/352 |
| 2014/0044137 A1* | 2/2014 | Miyaji | H04L 25/14 370/509 |
| 2014/0169783 A1* | 6/2014 | Surek | H04J 3/1652 398/10 |
| 2017/0005901 A1* | 1/2017 | Gareau | H04L 43/10 |
| 2017/0111116 A1* | 4/2017 | Ohara | H04B 10/40 |
| 2019/0081845 A1* | 3/2019 | Rafique | H04B 10/5161 |
| 2019/0229846 A1* | 7/2019 | Liu | H04B 17/30 |
| 2019/0319702 A1* | 10/2019 | Gazzola | H04B 10/073 |

OTHER PUBLICATIONS

IEEE Std 802.3bs-2017—IEEE Standard for Ethernet Amendment 10, literature, 2017.
IA OIF-FLEXE-01.0 Flex Ethernet Implementation Agreement, Optical Internetworking Forum(OIF), Mar. 2016, http://www.oiforum.eom/wp-content/uploads/QIF-FLEXE01.0.pdf.

* cited by examiner

PSI FIELD
(DURING FlexE MAPPING)

| Offset | Field |
|---|---|
| 0 | PT |
| 1 | RES |
| 2 | CSF \| RES |
| 3 | p |
| 4 | $n_1$ |
| 5 | $n_2$ |
| ⋮ | ⋮ |
| 3+p | $n_p$ |
|  | RES |
| 255 |  |

Fig. 5

PSI FIELD

| Offset | Field |
|---|---|
| 0 | PT |
| 1 | RES |
| 2 | CSF \| RES |
| 3 | p |
| 4 | $n_1$ |
| 5 | $n_2$ |
| ⋮ | ⋮ |
| 3+p | $n_p$ ← LOCAL SIGNAL QUALITY INFORMATION (p BITS) |
|  | $q_l$ ← REMOTE SIGNAL QUALITY INFORMATION (p BITS) |
|  | $q_r$ |
|  | RES |
| 255 |  |

Fig. 6

| NUMBER OF BLOCKS USED | (KNOWN METHOD) | PSI FIELD (FOURTH TO 3 + p-TH ROWS) | | | |
|---|---|---|---|---|---|
| | | (METHOD 1) REDUCE NUMBER OF REPRESENTATION BITS | (METHOD 2) CONFIGURE INFORMATION TO INCREASE HAMMING DISTANCE | (METHOD 3) ENSURE COMPATIBILITY WITH KNOWN METHOD | (METHOD 4) IMPART PARITY INFORMATION |
| 5 (25 G) | $n_i$=5 [00000101] | $n_i$=1 [00000001] | $n_i$=1 [00000001] | $n_i$=1 [10000001] | $n_i$=1 [00000001] |
| 10 (50 G) | $n_i$=10 [00001010] | $n_i$=2 [00000010] | $n_i$=2 [00000101] | $n_i$=2 [10000010] | $n_i$=2 [00000010] |
| 15 (75 G) | $n_i$=15 [00001111] | $n_i$=3 [00000011] | $n_i$=3 [00000110] | $n_i$=3 [10000011] | $n_i$=3 [10000011] |
| 20 (100 G) | $n_i$=20 [00010100] | $n_i$=4 [00000100] | $n_i$=4 [00001010] | $n_i$=4 [10000100] | $n_i$=4 [00000100] |

$(1 \leq i \leq p)$

Fig. 10

SIGNAL QUALITY INFORMATION NOTIFICATION METHOD AND RELAY COMMUNICATION APPARATUS

CROSS-REFERENCE TO RELATED APPLICATIONS

This application is a 371 U.S. National Phase of International Application No. PCT/JP2019/022315, filed on Jun. 5, 2019, which claims priority to Japanese Application No. 2018-118040 filed on Jun. 21, 2018. The entire disclosures of the above applications are incorporated herein by reference.

TECHNICAL FIELD

The present invention relates to a signal quality information notification method and a relay communication device.

BACKGROUND ART

A high-order multilevel modulation scheme is used to achieve a large communication capacity. Forward Error Correction (FEC), which is a type of error correction technique, is commonly used to maintain a high reception sensitivity, which may be required by the use of a high-order multi-level modulation scheme. Not only in Optical Transport Network (OTN), which is an optical communication standard for long-range high-capacity transmission and for which efforts for standardization have been made in ITU-T, FEC has been adopted for some of 100 G standards and 200 G/400 G standards in Ethernet (trade name) as well, for which efforts for standardization have been made in IEEE (for example, see Non Patent Literatures 1 and 2).

Bit errors caused by degradation of signal quality are corrected by FEC. In FEC, communication can continue with no effects on service unless possible errors exceed a correctable limit value (FEC correctable threshold). The amount by which errors are corrected by FEC can be used as an indicator of the signal quality. For example, in a case where the error correction amount by FEC for OTN exceeds a certain threshold, which is set smaller than the FEC correctable threshold, the signal quality is rated as degraded. In a hypothetical operational procedure, such rating is used as a trigger to switch to another communication path with no signal quality degradation in a higher-layer Internet Protocol (IP) network. This allows switching to a secure path before communication may be suddenly interrupted as a result of exceeding the FEC correctable threshold. Note that, in 200 G/400 G Ethernet (trade name), FEC degrade is defined as an option for a function indicating the signal quality by using the FEC.

The path switching in the IP network as described above requires communication of information to a receiving node, regarding the signal quality on the communication path between IP routers. Here, a signal quality information notification method that has been under study in ITU-T will be described using FIGS. 14 and 15.

FIG. 14 is a diagram illustrating a known signal quality communication method used in a case where a communication path between routers includes an optical transmission section with a transponder. An Ethernet (trade name) communication scheme is used for sections between a router and a transponder (section 1 and section 3), and an OTN communication scheme is used for a section between transponders (section 2). In a case where a signal is communicated from a router A to a router B, signal quality information based on FEC processing is generated in a coding unit of a transponder A, a mapping unit of a transponder B, and a coding unit of a router B. The signal quality information is incorporated into local signal quality information that is a part of an Ethernet (trade name) or OTN data frame, and transmitted in a downlink direction. When receiving the local signal quality information, the router B, that serves as a receiving end, configures the local signal quality information as remote signal quality information and sends the information back in an uplink direction. The router A receives the remote signal quality information and then performs an operation such as path switching.

FIG. 15 is a diagram illustrating an example of a known storage location of signal quality information. FIG. 15 illustrates an example using a Payload Structure Identifier (PSI) field of an Optical-channel Payload Unit (OPU) overhead as a storage location of signal quality information in the OTN section. For the storage location of each of the remote signal quality information and the local signal quality information, one bit of a Reserved region is assigned. The storage location of the remote signal quality information is a 1-bit region $q_r$, and the storage location of the local signal quality information storage location is a 1-bit region $q_l$. For example, in a case where the signal quality is degraded in a section 1 illustrated in FIG. 14, the transponder A changes the region $q_l$ in the PSI field to 1 and communicates this to the transponder B. The transponder B uses the FEC degrade function defined in Non Patent Literature 2 to communicate the local signal quality information to the router B. When receiving this information, the router B sends the remote signal quality information back to the router A by processing that is reversed in respect to the above-described processing. Note that, in a case where it is sufficient to communicate the signal quality information only in the downlink direction, the remote signal quality information is not necessarily required. In this example, only one bit is used for notification of the signal quality information in one direction, and thus, the section of the communication path in which degradation or an error has occurred is not identified.

CITATION LIST

Non Patent Literature

Non Patent Literature 1: ITU-T G. 709/Y. 1331, "Interfaces for the optical transport network," International Telecommunication Union, June, 2016.

Non Patent Literature 2: "IEEE Std 802.3bs-2017-IEEE Standard for Ethernet Amendment 10", 2017

Non Patent Literature 3: "IA OIF-FLEXE-01.0 Flex Ethernet Implementation Agreement", [online] March, 2016; Optical Internetworking Forum (OIF), [Search on Jun. 5, 2018], Internet: <http://www.oiforum.com/wp-content/uploads/OIF-FLEXE-01.0.pdf

SUMMARY OF THE INVENTION

Technical Problem

The signal quality information notification method described above assumes that the Ethernet (trade name) link in the sections 1 and 3 illustrated in FIG. 14 and the OTN link in the section 2 in FIG. 14 is on a one-to-one corresponding relationship and that information regarding signal quality degradation having occurred in the Ethernet (trade name) section or OTN section is mapped directly to the subsequent link. Here, in a case where a communication scheme including a plurality of physical links such as Flex Ethernet (FlexE (trade name)) is used in the Ethernet (trade name) section, the number of physical links used in the FlexE section is not necessarily equal to the number of transponders transmitted in the OTN section. There is no provision for a method for mapping, to the OTN section, signal quality information associated with signal degradation or the like having occurred at a certain physical link in the FlexE section. Furthermore, although knowing the section in which signal quality degradation has occurred is important for communication quality management, the section in which the degradation has occurred is not identifiable by using the known method.

In light of the foregoing, an object of the present invention is to provide a signal quality information notification method and a relay communication device that can communicate information regarding signal quality degradation having occurred in a communication path including a plurality of sections in which different communication schemes are used such that the section of occurrence can be identified.

Means for Solving the Problem

One aspect of the present invention is a signal quality information notification method in a communication system for transmitting relay data through a communication path including a plurality of sections in which different communication schemes are used, the signal quality information notification method including, by a relay communication device provided between a first section corresponding to one of the plurality of sections and a second section corresponding to another of the plurality of sections located adjacent to the first section, receiving the relay data from the first section through a frame of a first communication scheme, and performing relaying including configuring, in a frame of a second communication scheme used to transmit the relay data to a relay destination, signal quality information representing signal quality calculated for a physical link in each of the sections through which the relay data is transmitted before arriving at the relay communication device, and outputting the frame of the second communication scheme to the second section.

One aspect of the present invention is the signal quality information notification method described above, in which, in the performing relaying, a correspondence between the physical link and the signal quality information calculated for the physical link is configured in the frame of the second communication scheme in a format in which the correspondence is uniquely identifiable.

One aspect of the present invention is the signal quality information notification method described above, in which, in a case where the second communication scheme is an Optical Transport Network (OTN), in the performing relaying, the signal quality information regarding the physical link is configured in a part of a Payload Structure Identifier (PSI) field of an Optical-channel Payload Unit (OPU).

One aspect of the present invention is the signal quality information notification method described above, in which, in a case where the first communication scheme is a Flex Ethernet (trade name, FlexE), in the performing relaying, the signal quality information regarding the physical link in the first section is configured in an unused bit region included in block count configuration regions corresponding to bit regions in the PSI field each assigned to the physical link and configured with the number of in-use transmission blocks in the physical link.

One aspect of the present invention is the signal quality information notification method described above, in which the information regarding the number of in-use transmission blocks that is configured in the block count configuration region is encoded to increase a Hamming distance.

One aspect of the present invention is the signal quality information notification method described above, in which the block count configuration region partially includes a bit region to ensure compatibility with a known scheme.

One aspect of the present invention is the signal quality information notification method described above, in which the block count configuration region partially includes a region in which parity computed for the block count configuration region is configured.

One aspect of the present invention is a relay communication device in a communication system for transmitting relay data through a communication path including a plurality of sections in which different communication schemes are used, the relay communication device being provided between a first section corresponding to one of the plurality of sections and a second section corresponding to another of the plurality of sections located adjacent to the first section, the relay communication device including: a receiving unit configured to receive the relay data from the first section through a frame of a first communication scheme; and a relaying unit configured to configure, in a frame of a second communication scheme used to transmit the relay data to a relay destination, signal quality information representing signal quality calculated for a physical link in each of the sections through which the relay data is transmitted before arriving at the relay communication device, and output the frame of the second communication scheme to the second section.

Effects of the Invention

According to the present invention, information regarding signal quality degradation having occurred in a communication path including a plurality of sections in which different communication schemes are used can be communicated in such a manner that the section of occurrence can be identified.

BRIEF DESCRIPTION OF DRAWINGS

FIG. 5 is a diagram illustrating the PSI field according to the first embodiment.

FIG. 6 is a diagram illustrating an RES field according to the first embodiment.

FIG. 10 is a diagram illustrating a PSI field configuration method according to the second embodiment.

DESCRIPTION OF EMBODIMENTS

Hereinafter, embodiments of the present invention will be described in detail with reference to the drawings.

First Embodiment

Figure 1:
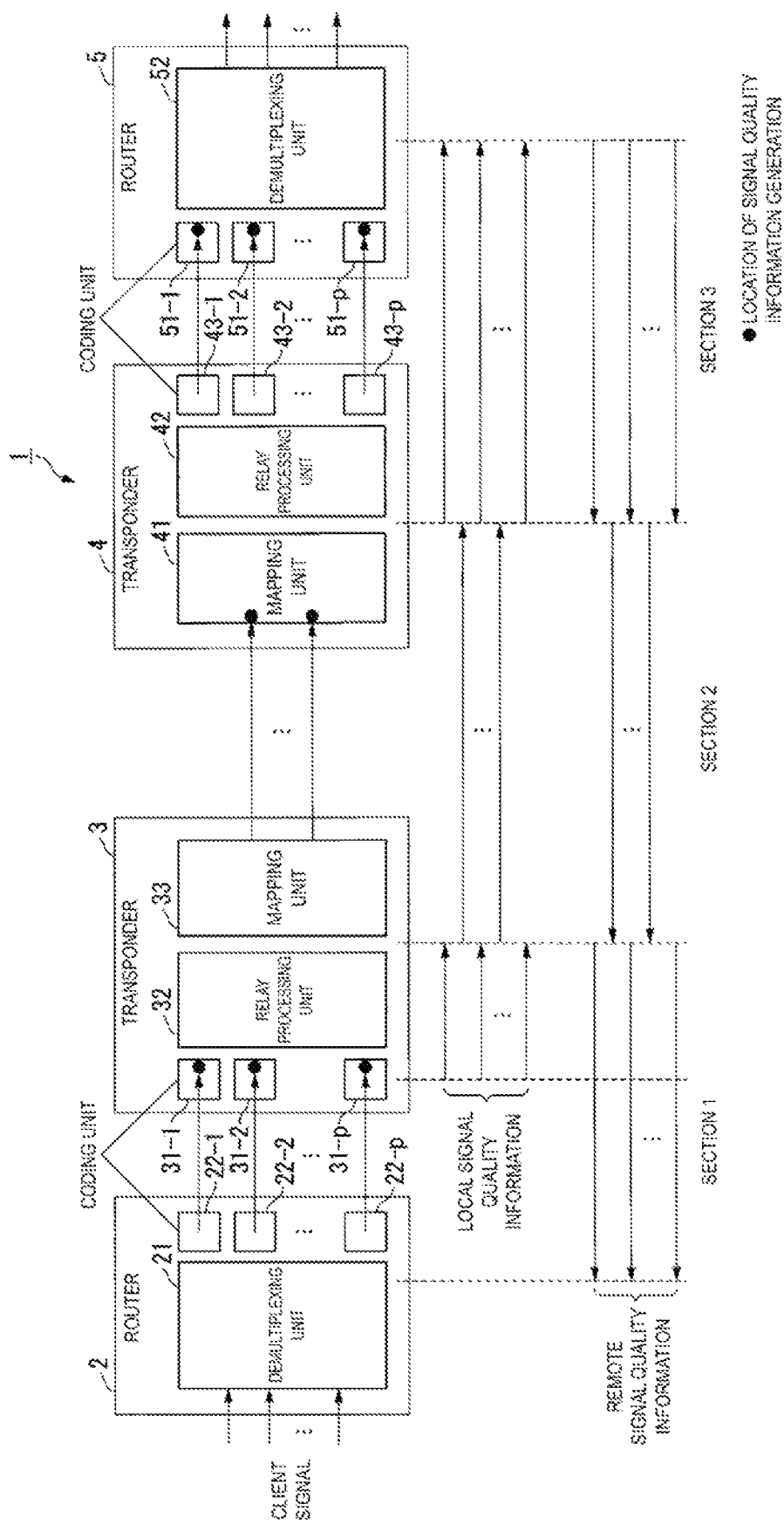
FIG. 1 is a diagram illustrating a configuration of a communication system according to a first embodiment of the present disclosure.

FIG. 1 is a diagram illustrating a configuration of a communication system 1 according to a first embodiment. The communication system 1 illustrated in FIG. 1 includes a router 2, a transponder 3, a transponder 4, and a router 5. A section 1 is located between the router 2 and the transponder 3, a section 2 is located between the transponder 3 and the transponder 4, and a section 3 is located between the transponder 4 and the router 5. A direction from the router 2 to the router 5 is described as an uplink direction, and a direction from the router 5 to the router 2 is described as a downlink direction.

The router 2 and the transponder 3 are at the same site. The router 5 and the transponder 4 are at the same sites, which is different from the site of the router 2 and the transponder 3. In the section 1 between the router 2 and the transponder 3 and in the section 3 between the transponder 4 and the router 5, the router and the transponder are connected by short-range communication paths based on FlexE. FlexE includes p Ethernet (trade name) links (p is an integer of 1 or greater) connected in parallel. In the section 2 between the transponder 3 and the transponder 4, the transponder 3 and the transponder 4 are connected by long-range communication paths based on OTN. The number of Ethernet (trade name) links in the section 1 may differ from the number of OTN links in the section 2. However, the number of Ethernet (trade name) links in the section 1 is the same as the number of Ethernet (trade name) links in section 3.

Note that FIG. 1 illustrates, for the router 2, only a functional part related to inputs and outputs between the router 2 and the transponder 3, and for the router 5, only a functional part related to inputs and outputs between the router 5 and the transponder 4. Thus, FIG. 1 omits description of a functional part executing packet processing including the routing processing in the routers 2 and 5.

The router 2 includes a demultiplexing unit 21 and p coding units 22. An i-th (where i is an integer of 1 or greater and p or smaller) coding unit 22 is referred to as a coding unit 22-$i$. The demultiplexing unit 21 multiplexes uplink client signals, and then demultiplexes the signal into p uplink data and distributes and outputs the data to the coding unit 22-1 to 22-$p$. The coding unit 22-$i$ encodes the uplink data input from the demultiplexing unit 21, and transmits the encoded data to a coding unit 31-$i$ of the transponder 3 described below.

The transponder 3 includes p coding units 31, a relay processing unit 32, and a mapping unit 33. An i-th (where i is an integer of 1 or greater and p or smaller) coding unit 31 is referred to as a coding unit 31-$i$. The coding unit 31-$i$ decodes the uplink data received from the corresponding coding unit 22-$i$, and calculates uplink signal quality in the physical links in the section 1 between the coding unit 31-$i$ and the coding unit 22-$i$. The coding unit 31-$i$ generates the signal quality information in a case where degradation of the signal quality is detected. Note that the signal quality information may be information representing whether degradation of the signal quality has occurred. The same is true for signal quality information generated at other nodes. The coding units 31-1 to 31-$p$ outputs the decoded uplink data and the generated signal quality information to the relay processing unit 32. The relay processing unit 32 acquires the uplink client signals mapped to the uplink data input from the coding units 31-1 to 31-$p$, and outputs the acquired uplink client signals and the signal quality information regarding the section 1 to the mapping unit 33. The mapping unit 33 multiplexes the uplink client signals acquired by the relay processing unit 32 into one frame. Furthermore, the mapping unit 33 configures local signal quality information in the frame and encodes the frame. The local signal quality information represents uplink signal quality information regarding the section 1. The mapping unit 33 demultiplexes the encoded frame into q frames (q is an integer of 1 or greater) and transmits the resultant frames to the transponder 4 by optical signals.

The transponder 4 includes a mapping unit 41, a relay processing unit 42, and p coding units 43. An i-th (where i is an integer of 1 or greater and p or smaller) coding unit 43 is referred to as a coding unit 43-$i$. The mapping unit 41 receives, from the transponder 3, q frames of optical signals configured with the uplink client signals, maps the received frames into one frame, and decodes the resultant frame. Furthermore, the mapping unit 41 calculates the uplink signal quality for each physical link in the section 2. The mapping unit 41 generates the signal quality information in a case where degradation of the signal quality is detected. The relay processing unit 42 demultiplexes the uplink client signals into p signals and outputs the resultant signals to the coding units 43-1 to 43-$p$. The uplink client signals are the uplink client signals included in the frames decoded by the mapping unit 41. Furthermore, the relay processing unit 42 outputs the following two pieces of information to the coding unit 43-1 to 43-$p$. A first piece of information is local signal quality information acquired from the decoded frames. A second piece of information is signal quality information regarding the section 2 generated by the mapping unit 41. The coding units 43-1 to 43-$p$ map the uplink client signals input from the relay processing unit 42. Furthermore, the coding units 43-1 to 43-$p$ encode the uplink data configured with the local signal quality information and transmits the encoded data to the router 5. The local signal quality information indicates uplink signal quality information regarding the sections 1 and 2.

The router 5 includes p coding units 51 and a demultiplexing unit 52. An i-th (where i is an integer of 1 or greater and p or smaller) coding unit 51 is referred to as a coding unit 51-$i$. The coding unit 51-$i$ decodes the uplink data received from the corresponding coding unit 43-$i$, and calculates the uplink signal quality in the physical link in the section 3 between the coding unit 51-$i$ and the coding unit 43-$i$. In a case of detecting degradation of the signal quality, the coding unit 51-$i$ generates the signal quality information. The coding unit 51-$i$ outputs the following two data to the demultiplexing unit 52. First data is decoded uplink data, and second data is the generated signal quality information regarding the section 3. The demultiplexing unit 52 reconfigures and outputs each of the client signals mapped to the uplink data input from the coding units 51-1 to 51-*p*. Furthermore, the demultiplexing unit 52 identifies the section or physical link in which the signal quality is degraded, based on the following two pieces of information. A first of the two pieces of information is uplink signal quality information regarding the sections 1 and 2 indicated by the local signal quality information configured in the uplink data. A second of the two pieces of information is the signal quality information generated by the coding units 51-1 to 51-*p*.

In a case where the router 5 notifies the signal quality information in the downlink direction, the demultiplexing unit 52 multiplexes the downlink client signals. Subsequently, the demultiplexing unit 52 demultiplexes the signal into p downlink data and outputs the resultant data to the coding units 52-1 to 52-*p* together with the local signal quality information. The local signal quality information indicates uplink signal quality information regarding the sections 1 to 3. The coding unit 52-*i* appends the local signal quality information to the downlink data input from the demultiplexing unit 21 and encodes the downlink data, and transmits the encoded downlink data to the coding unit 43-*i* of the transponder 4.

The coding unit 43-*i* of the transponder 4 decodes the downlink data received from the coding unit 51-*i*, and calculates the downlink signal quality in the physical link in the section 3 between the coding unit 43-*i* and the coding unit 51-*i*. The coding unit 43-*i* of the transponder 4 generates the signal quality information in a case of detecting degradation of the signal quality. The coding units 43-1 to 43-*p* provides the following three outputs to the relay processing unit 42. A first output is the decoded downlink data, a second output is the local signal quality information acquired from the downlink data, and a third output is the generated signal quality information. The relay processing unit 42 acquires the downlink client signals mapped to the downlink data received from the coding units 43-1 to 43-*p*, and provides the following three outputs to the mapping unit 41. A first output is the acquired downlink client signals, a second output is local signal quality information, and a third output is the downlink signal quality information regarding each physical link in the section 3. The mapping unit 41 multiplexes the downlink client signals into one frame. The downlink client signals described above are acquired by the relay processing unit 42. Furthermore, the mapping unit 41 configures the following two in the frame, and encodes the frame. A first one of the two is the local signal quality information, and a second one of the two is remote signal quality information indicating the downlink signal quality information regarding the section 3. The mapping unit 41 demultiplexes the encoded frame into q frames and transmits the resultant frames to the transponder 3 by optical signals.

The mapping unit 33 of the transponder 3 receives, from the transponders 4, the q frames of optical signals configured with the downlink client signals, maps the frames into one frame, and decodes the resultant frame. The mapping unit 33 calculates the downlink signal quality in each physical link in the section 2. The mapping unit 33 generates the signal quality information in a case where degradation of signal quality is detected. The relay processing unit 32 demultiplexes the downlink client signals into p signals and outputs the signals to the coding unit 31-1 to 31-*p*. The downlink client signals are included in the frame decoded by the mapping unit 33. Furthermore, the relay processing unit 32 provides the following outputs to the coding units 31-1 to 31-*p*. The outputs include the local signal quality information and remote signal quality information acquired from the decoded frame and the signal quality information regarding the section 2 generated by the relay processing unit 32. The coding units 31-1 to 31-*p* map the downlink client signals input from the relay processing unit 32. Furthermore, the coding units 31-1 to 31-*p* encode the downlink data configured with the local signal quality information and the remote signal quality information indicating the downlink signal quality information regarding the sections 2 and 3, and transmits the encoded data to the router 2.

The coding unit 22-*i* of the router 2 decodes the downlink data received from the coding unit 31-*i* of the transponder 3, and calculates the downlink signal quality in each physical link in the section 1 between the coding unit 22-*i* and the coding unit 31-*i*. The coding unit 22-*i* of the router 2 generates the signal quality information in a case where degradation of the signal quality is detected. The coding unit 22-*i* provides the following two outputs to the demultiplexing unit 52. A first output is the decoded downlink data, and a second output is the generated signal quality information. The demultiplexing unit 21 identifies the section or physical link in which the signal quality is degraded, based on the following. The above-described information is the local signal quality information and local signal quality information configured in the downlink data and the signal quality information regarding the section 1 generated by the coding units 22-1 to 22-*p*.

According to the configuration described above, the uplink client signal on which the router 2 has completely executed the routing processing is input to the demultiplexing unit 21, and communicated to the demultiplexing unit 52 of the router 5, corresponding to the destination. The downlink client signal is input to the demultiplexing unit 52 of the router 5, and transmitted to the demultiplexing unit 21 of the router 2, corresponding to the destination.

Here, a FlexE Aware Mapping scheme to which the present embodiment is applied will be described. The FlexE Aware Mapping scheme is one of the communication schemes described in Non Patent Literature 3. Note that it is hereinafter assumed that 100 GbE is used for the Ethernet (trade name) links included in FlexE but that the present embodiment can also be applied at other rates. Uplink communication will be described below.

The demultiplexing unit 21 of the router 2 generates a block row called Calendar from a plurality of client signals. One block is constituted by 66 bytes. The demultiplexing unit 21 demultiplexes the generated Calendar into Sub-calendars each with 20 blocks according to the number of Ethernet (trade name) links in the section 1.

Figure 2:
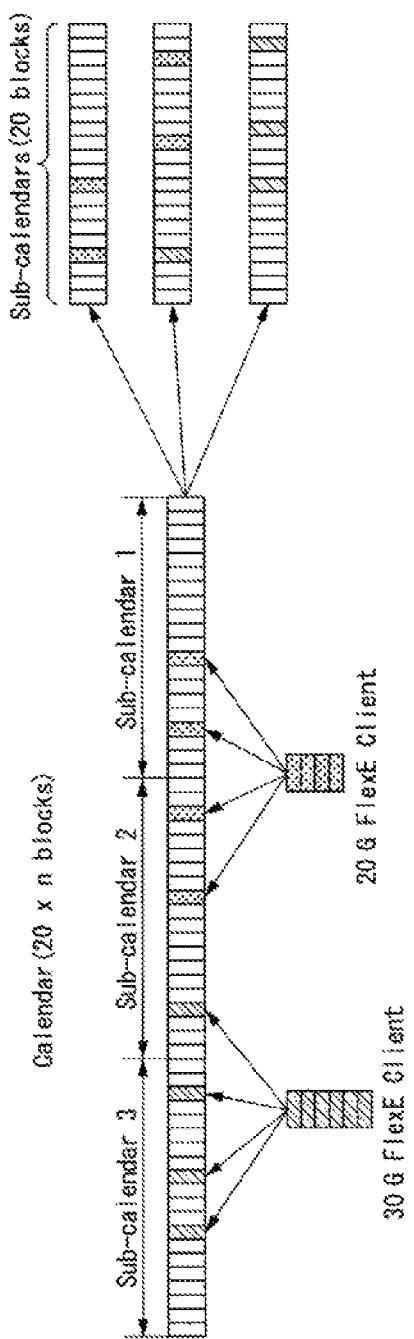
FIG. 2 is a diagram illustrating a Calendar and a Sub-calendar to which the first embodiment is applied.

FIG. 2 illustrates Calendar and Sub-calendar. FIG. 2 illustrates an example of demultiplexing by the demultiplexing unit 21. In the example, the demultiplexing unit 21 maps a 30 G client signal (30 G FlexE Client) and a 20 G client signal (20 G FlexE Client) into a block row including 20×n blocks (n=3 in FIG. 2) to constitute Calendar. Subsequently, the demultiplexing unit 21 demultiplexes Calendar into three Sub-calendars. Sub-calendar i is transmitted in the i-th Ethernet (trade name) link. The demultiplexing unit 21 further inserts one FlexE overhead at every 1023 Sub-calendars transmitted through each Ethernet (trade name) link. For n=p, the demultiplexing unit 21 outputs Sub-calendar i to the coding unit 22-*i*. The coding unit 22-*i* encodes the Sub-calendar i input from the demultiplexing unit 21 and transmits encoded Sub-calendar i to the transponder 3.

The coding unit 22-*i* executes, on Sub-calendar, scramble processing corresponding to a function of a PHYsical Coding Sublayer (PCS) layer in Ethernet (trade name), alignment marker processing in a PCS lane, and the like, and then transmits Sub-calendar to the coding unit 31-*i* of the counterpart transponder 3.

The coding unit 31-*i* of the transponder 3 restores the received signal into Sub-calendar i. The relay processing unit 32 removes unused blocks from the blocks included in Sub-calendars 1 to p restored by the respective coding units 31-1 to 31-*p*, and passes only the in-use blocks to the mapping unit 33. This enables a reduction in unnecessary transmission bands in the OTN section. The mapping unit 33 maps the blocks received from the relay processing unit 32 to an OPUflex frame, and then communicates the frame to the transponder 4 by using the OTN.

The transponder 4 and the router 5 executes processing that is reversed in respect to the above-described operations of the transponder 3 and the router 2 to communicate the client signals to the router 5. In other words, the mapping unit 41 of the transponder 4 acquires the blocks configured with the client signals, from the OPUflex frame received from the transponder 3. The relay processing unit 42 configures Sub-calendars 1 to p from the blocks acquired by the mapping unit 41. The coding unit 43-*i* executes, on Sub-calendar i, the scramble processing corresponding to the function of the PHYsical Coding Sublayer (PCS) layer in Ethernet (trade name), the alignment marker processing in the PCS lane, and the like, and then transmits Sub-calendar i to the coding unit 51-*i* of the counterpart router 5. The coding unit 51-*i* of the router 5 restores Sub-calendar i from the received signals. The demultiplexing unit 52 configures Calendar from Sub-calendars 1 to p. The demultiplexing unit 52 restores and outputs each of the client signals mapped to the Calendar blocks.

Signal quality information indicative of degradation of the signal quality or errors is detected and generated at a receiving end of a communication path.

Specifically, in a case where the communication system 1 illustrated in FIG. 1 communicates in a direction from the router 2 to the router 5, signals in the section 1 are detected and generated by the coding unit 31 of the transponder 3, signals in the section 2 are detected and generated by the mapping unit 41 of the transponder 4, and signals in the section 3 are detected and generated by the coding unit 51 of the router 5.

Note that the communication system 1 communicates in the downlink direction as follows. The demultiplexing unit 52 and the coding unit 51 of the router 5 respectively execute processing similar to the processing executed by the demultiplexing unit 21 and the coding unit 22 of the router 2. The coding unit 43, the relay processing unit 42, and the mapping unit 41 of the transponders 4 respectively execute processing similar to the processing executed by the coding unit 31, the relay processing unit 32, and the mapping unit 33 of the transponder 3. The mapping unit 33, the relay processing unit 32, and the coding unit 31 of the transponders 3 respectively execute processing similar to the processing executed by the mapping unit 41, the relay processing unit 42, and the coding unit 43 of the transponder 4. The coding unit 22 and the demultiplexing unit 21 of the router 2 respectively execute processing similar to the processing executed by the coding unit 51 and the demultiplexing unit 52 of the router 5. In this case, the point at which the signal quality information is detected and generated is located at a position in reverse to the point for the communication from the router 5 to the router 2. In other words, signals in the section 3 are detected and generated by the coding unit 43 of the transponder 4, signals in the section 2 are detected and generated by the mapping unit 33 of the transponder 3, and signals in the section 1 are detected and generated by the coding unit 22 of the router 2.

The signal quality information detected and generated by each unit is written to a transmission frame of a communication scheme used for transmission to a relay destination. A transmission frame transmitted from the router 2, used as a source, toward the router 5, used as a destination, is configured with local signal quality information used to notify the destination of the signal quality information, and transferred. On the other hand, a transmission frame transmitted from the router 5 toward the router 2 is configured with remote signal quality information used to report to the router 2 that the local signal quality information has successfully reached the router 5, and transferred.

The following description relates to a method for generating signal quality information in a case where degradation of the signal quality occurs in each of the sections 1 to 3, and a method for identifying the section with the signal quality degraded at the receiving end will be described.

(a) In a case where signal quality degradation occurs in the section 1

Signal quality information associated with signal quality degradation in the section 1 is generated in the coding unit 31 of the transponder 3 in FIG. 1. First, a method for mapping signal quality information regarding a FlexE section to an OTN section will be described.

Figure 3:
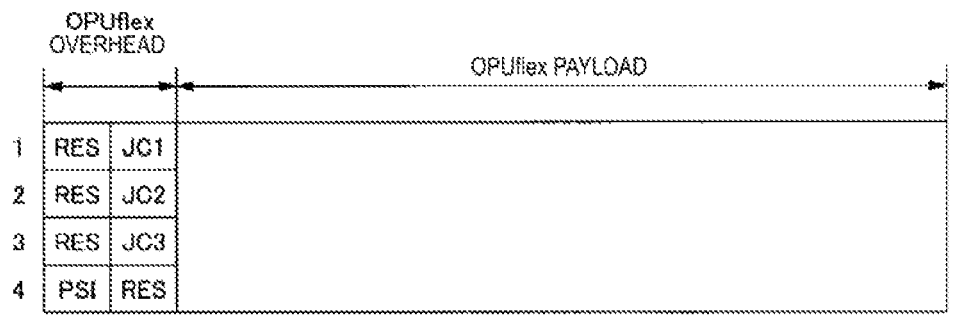
FIG. 3 is a diagram illustrating an OPUflex frame configuration to which the first embodiment is applied.
Figure 4:
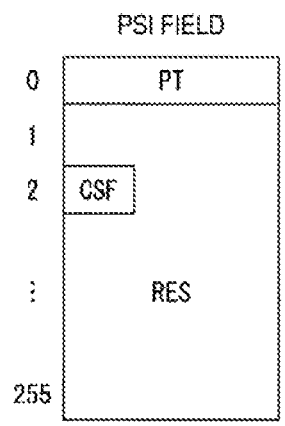
FIG. 4 is a diagram illustrating a PSI field to which the first embodiment is applied.

FIG. 3 is a diagram illustrating an OPUflex frame configuration defined by G. 709. An OPUflex payload is configured with a client signal. A PSI field, which is a part of an OPUflex header, includes a multiframe. FIG. 4 is a diagram illustrating the PSI field. As illustrated in FIG. 4, the PSI field includes a field (PT) indicating a payload type, a field (CSF) indicating a client signal error, and a remaining portion including a reserved region (RES).

FIG. 5 is a diagram illustrating the PSI field during FlexE mapping. In a case where the Calendar signal is accommodated in the OPUflex payload in accordance with the FlexE Aware Mapping scheme defined by OIF, the number (p) of Ethernet (trade name) links included in FlexE is configured in the third line of the PSI field, as illustrated in FIG. 5. Furthermore, the number of in-use data blocks included in the 20 blocks for the Sub-calendar signal accommodated in each of the p Ethernet (trade name) links is configured in the PSI field, specifically, from the fourth row to the 3+p-th row in the PSI field. The remaining rows, from 3+p+1-th and subsequent rows in the PSI field, correspond to RES. In the first embodiment, the signal quality information is inserted into the RES field.

FIG. 6 is a diagram illustrating an example of the RES field in which the signal quality information is inserted. In FIG. 6, the local signal quality information is configured in rows in the RES field starting with the (3+p+1)-th row, and subsequently, the remote signal quality information is configured. The local signal quality information and the remote signal quality information may be configured in one bit for each Ethernet (trade name) link. Thus, each of the local signal quality information and the remote signal quality information includes p bits. However, the remote signal quality information is configured only at the time of transmission from the receiving side (downlink communication).

The mapping unit 33 generates an OTU frame including an OPUflex frame and an error correcting code such as FEC. The mapping unit 33 divides the OTU frame into blocks and distributes and outputs the resultant blocks to a plurality of OTN links. The OTN links can be, for example, periodically changed that transmit blocks configured with the PSI field. The mapping unit 33 writes the same FlexE signal quality information to all the OPUflex overheads in the OTN links. Alternatively, the OTN links may be associated with the FlexE Ethernet (trade name) links in advance, and the OPUflex overheads transmitted by certain OTN links may be configured with the signal quality information regarding the corresponding to Ethernet (trade name) links.

Figure 7:
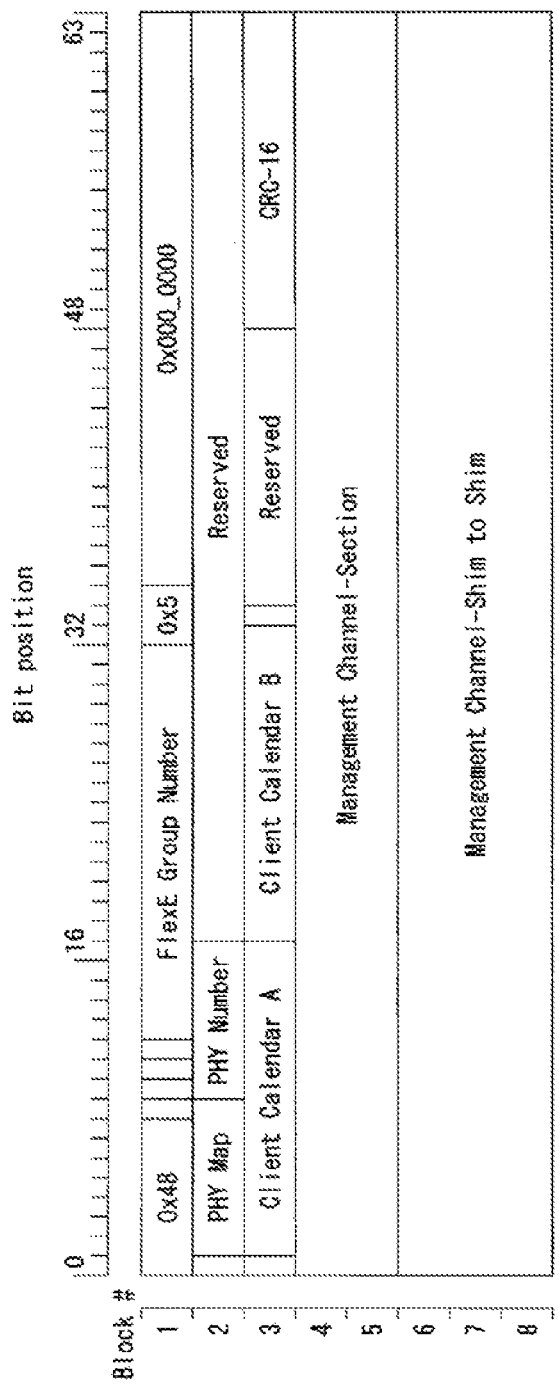
FIG. 7 is a diagram illustrating fields of FlexE overhead according to the first embodiment.

FIG. 7 is a diagram illustrating fields of the FlexE overhead. The Ethernet (trade name) links described above can be uniquely identified in a PHY Number field of the FlexE overhead illustrated in FIG. 7. Thus, the Ethernet (trade name) link can be easily associated with each bit of the signal quality information included in the OPUflex header. For example, in a case where the q-th bit of the local signal quality information is 1, the receiving side determines that signal quality degradation or an error has occurred in the Ethernet (trade name) link with a PHY Number associated with the q-th bit. In other words, a bit position in the local signal quality information configured with 1 corresponds to identification information regarding the Ethernet (trade name) link for which the signal quality information has been generated in the section 1.

Now, a method will be described in which the signal quality information received by the transponder 4 through the section 2 is mapped to FlexE in the section 3. The OTN frame received by the transponder 4 includes identification information regarding the Ethernet (trade name) link in the section 1 for which the signal quality information has been generated. The coding unit 43 of the transponder 4 maps an OPU payload to the FlexE Sub-calendar signal, while simultaneously configuring the signal quality information to the FlexE overhead of the Ethernet (trade name) link with the PHY Number corresponding to the identification information. For the target for which the signal quality information is configured, for example, a predetermined 1 bit in the Reserved region of the FlexE overhead illustrated in FIG. 7 is used and configured such that the bit is 0 for Ethernet (trade name) links for which no signal quality information is configured and is 1 for Ethernet (trade name) links for which the signal quality information is configured. Accordingly, a notification of generation of the signal quality information can be communicated to the router 5 in such a manner that the Ethernet (trade name) link for which the signal quality information has been generated can be identified. The demultiplexing unit 52 of the router 5 can determine that signal quality degradation has occurred in the section 1 in a case where the above-described bit is configured for one or more Ethernet (trade name) links in the FlexE signals received by the coding units 51-1 to 51-$p$ of the router 5.

(b) In a case where signal quality degradation occurs in the section 2

In a case where the signal quality information is generated in any of the links in the OTN section, the transponder 4 uses one bit in the Reserved region of the FlexE overhead to configure, for the Ethernet (trade name) links in all the FlexE sections, a bit indicating generation of signal quality information. That is, all of the coding units 43-1 to 43-$p$ of the transponder 4 configure 1 in a predetermined one bit in the Reserved region of the FlexE overhead. The demultiplexing unit 52 of the router 5 can determine that the signal quality information has been generated in the section 2 in a case where the above-described bit is detected in the FlexE overheads of all the Ethernet (trade name) links between the router 5 and the transponder 4.

(c) In a case where signal quality degradation occurs in the section 3

In a case where signal quality degradation occurs in the section 3, the signal quality information is generated at the coding unit 51 of the router 5, while no bit indicating generation of the signal quality information in the FlexE overhead is detected in any of the Ethernet (trade name) links. This allows the determination that signal quality degradation has occurred in the section 3.

In the present embodiment, the communication path between points includes a plurality of sections in which different communication schemes are used, and to the frame transmitted through each of the physical links (transmission paths) in each section, the signal quality information regarding all the preceding transmission links transmitted through the physical link is written. Accordingly, in the present embodiment, the signal quality information indicating degradation of the signal quality having occurred in a certain physical link can be communicated in such a manner that the section of occurrence can be identified at the receiving end.

Second Embodiment

Figure 8:
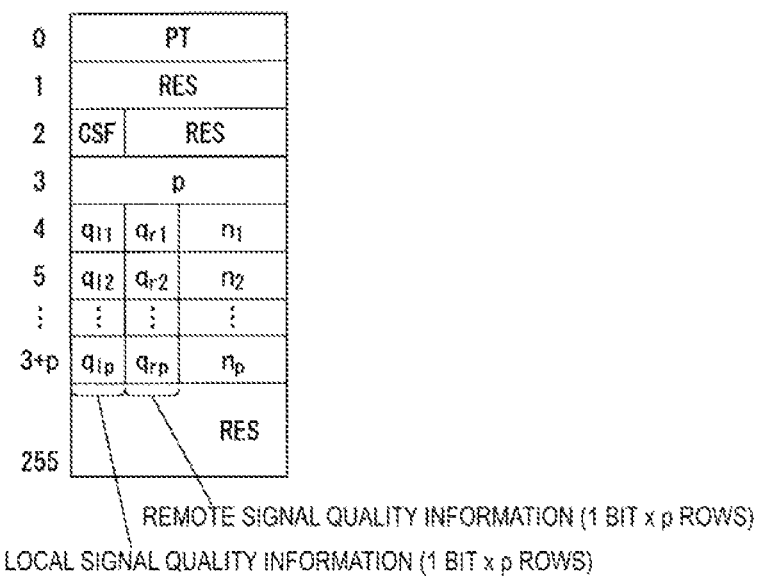
FIG. 8 is a diagram illustrating a PSI field according to a second embodiment.

FIG. 8 is a diagram illustrating a PSI field according to a second embodiment. The second embodiment is the same as the first embodiment in that p bits of the local signal quality information and p bits of the remote signal quality information are configured in the PSI field. In FIG. 8, the local signal quality information and the remote signal quality information are configured, in an interruptive manner, in some of the fields $n_1$ to $n_p$ configured with the number of in-use data blocks included in the 20 blocks for the Sub-calendar signal accommodated in the Ethernet (trade name) link. Here, it is assumed that the fields representing the local signal quality information, the remote signal quality information, and the number of in-use data blocks, which are configured in the same rows in the PSI field correspond to the same Ethernet (trade name) link. In other words, the 3+i-th row of the PSI field is configured with the local signal quality information, the remote signal quality information, and the number of in-use data blocks regarding the i-th Ethernet (trade name) link in the section 1.

The Sub-calendar signal is fixed to 20 blocks. The number of bits that can be represented in binary numbers is at most five. On the other hand, each row of the PSI field has eight bits, and thus three bits correspond to an unused region. By using this region to configure the local signal quality information and the remote signal quality information, the signal quality information can be communicated without using the RES region.

Third Embodiment

The first and second embodiments define one piece of signal quality information for the entire Sub-calendar, whereas in the present embodiment defines a plurality of pieces of signal quality information for Sub-calendar. Accordingly, for a bit error having occurred in some blocks in Sub-calendar, which range of blocks has suffered the effect of the bit error can be communicated between transmitting and receiving nodes.

Figure 9:
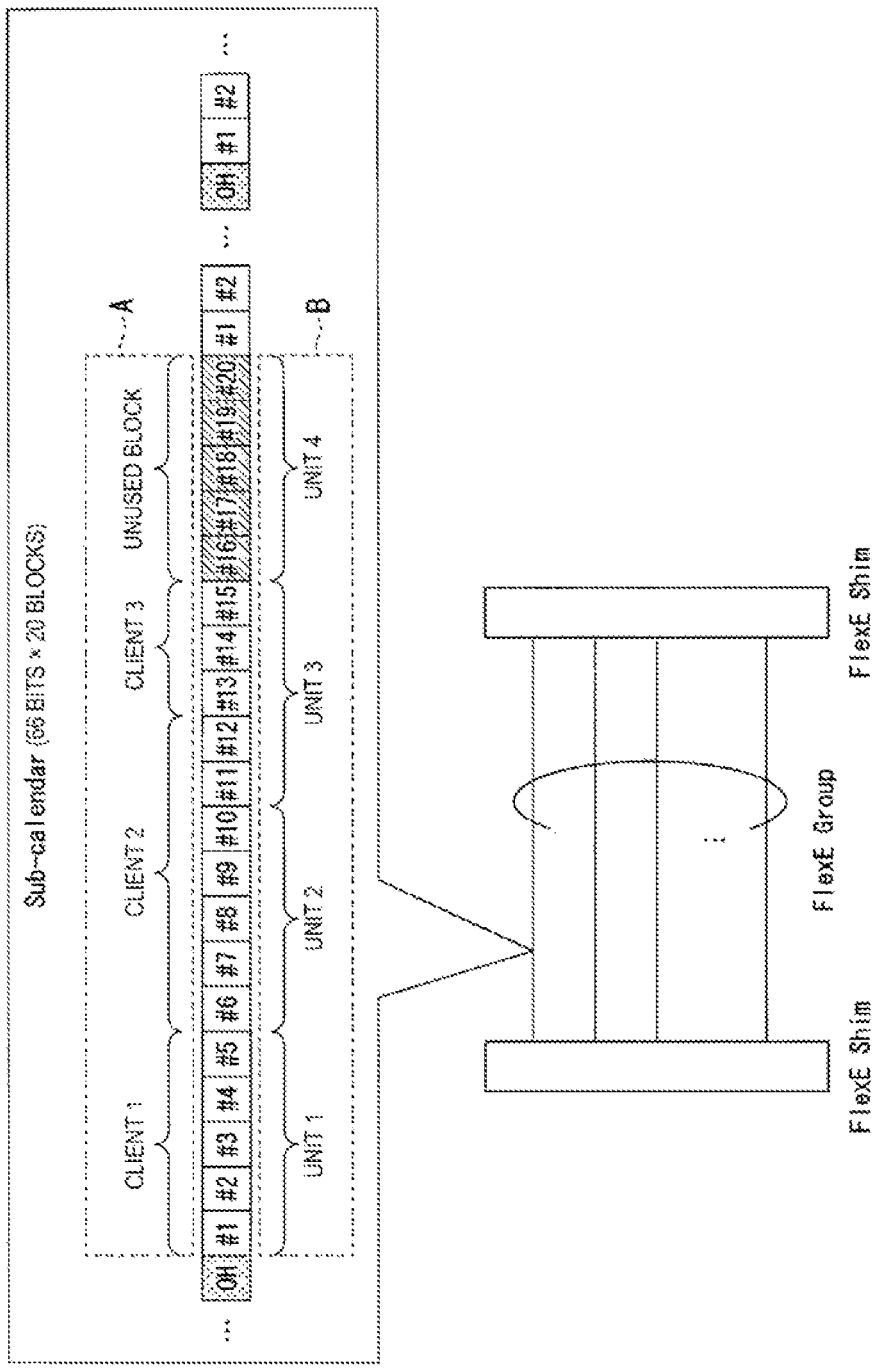
FIG. 9 is a diagram illustrating an example of demultiplexing of the Sub-calendar according to the second embodiment.

FIG. 9 is a diagram illustrating an example of demultiplexing Sub-calendar into a plurality of units to achieve the object described above. Two methods for the demultiplexing are available. A first demultiplexing method indicated by reference sign A is a method for demultiplexing for each client. In FIG. 9, for the 20 blocks not including the FlexE overhead, 5, 7, and 3 blocks are respectively assigned to the clients 1, 2, and 3, with the remaining five blocks unused. A second demultiplexing method indicated by reference sign B is a method for demultiplexing into fixed block units. In FIG.

9, Sub-calendar is demultiplexed into four units each of five blocks. In the example illustrated in FIG. 9, the two demultiplexing methods both demultiplex Sub-calendar into four units. Thus, four bits can be used to configure the signal quality information regarding each unit.

A method for configuring a plurality of pieces of signal quality information for one Sub-calendar will be described by using FIGS. 10 to 13.

FIG. 10 is a diagram illustrating the numbers of available slots and a plurality of PSI field configuration methods for the numbers of slots. The table in FIG. 10 indicates the numbers of available slots and a plurality of PSI field configuration methods for the numbers of slots. The number of available slots represents the granularity of FlexE transmission rate. In Non Patent Literatures, in a case where the FlexE Aware Mapping scheme is applied, a FlexE transmission band with a granularity of 25 Gbps (5 blocks) is assumed. In view of this, as an example, FIG. 10 illustrates that 20 blocks for Sub-calendar are demultiplexed into four groups each of five blocks. However, the present embodiment can be applied even in a case where the number of groups resulting from demultiplexing is not four. Note that the group is assumed to be a general term for a demultiplexing unit based on the number of clients or the number of units in FIG. 9.

Figure 11:
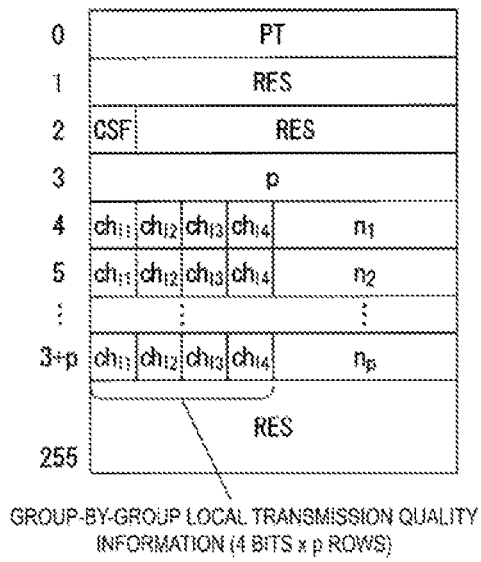
FIG. 11 is a diagram illustrating a PSI field according to the second embodiment.

FIG. 11 is a diagram illustrating the PSI field according to the present embodiment. As illustrated in FIG. 11, the fourth to 3+p-th rows in the PSI field correspond to the respective p Ethernet (trade name) links included in FlexE. The 3+i-th row in the PSI field is an 8-bit sequence indicating the number of in-use Sub-calendar blocks in the i-th Ethernet (trade name) link. In the bit sequence, four bits $ch_{11}$, $ch_{12}$, $ch_{13}$, and $ch_{14}$ are defined as group-by-group local signal quality information, and local signal quality information for each group is configured in each bit. In other words, the signal quality information regarding the j-th unit (j is an integer of 1 or greater and 4 or smaller) of the four units is configured in $ch_{ij}$. Then, the remaining four bits are denoted as $n_i$.

The table illustrated in FIG. 10 indicates methods for representing the number of in-use Sub-calendar blocks ($n_1$ to $n_p$) by using the remaining four bits resulting from exclusion of the group-by-group local signal quality information from $n_i$. In a known method, a bit sequence representing the number of available slots in two bits is assigned. The number of bits required in this case is five, and thus the group-by-group local signal quality information fails to be allocated.

A method 1 utilizes the granularity of the number of blocks used being in units of five slots to reduce the number of bits represented. In other words, $n_i$ is configured with the number of in-use groups in the nth Ethernet (trade name) link. In a case where the number of groups is four, the required number of bits is three. Thus, the remaining five bits can be used for the group-by-group local signal quality information.

A method 2 encodes and configures information representing the number of blocks used, to increase the Hamming distance between bits indicating the number of blocks used. The method 1 involves two combinations with a Hamming distance of 1 (the numbers of blocks used are 5 and 15, and 10 and 15), while the method 2 involves one combination with a Hamming distance of 1 (the numbers of blocks used are 5 and 10). Thus, in addition to enabling the number of bits required to be reduced to four like the method 1, the method 2 increases resistance to bit errors.

A method 3 configures the first one bit as a bit used to ensure compatibility with the known method. In the method 3, in a case where the first bit is 1, the method 1 is applied to the sixth to eighth bits to allow the second to fifth bits to be configured for the group-by-group local signal quality information. On the other hand, in a case where the first bit is 0, the known method can be directly configured for the fourth to eighth bits. Thus, with compatibility with the known method ensured, the group-by-group local signal quality information can be configured.

A method 4 imparts parity information to some bits. In the example illustrated in FIG. 10, in a case where the number of bits included in the second to eighth bits and configured with 1 is an odd number, 0 is configured in the first bit, and in a case where the number of bits is an even number, 1 is configured in the first bit. In the example illustrated in FIG. 10, the second to fifth bits are configured for the group-by-group local signal quality information, and the method 1 is applied to the sixth to eighth bits. This method not only enables the group-by-group local signal quality information to be stored but also allows individual detection of whether a bit error has occurred in the fourth to 3+p-th rows in the PSI field.

Figure 12:
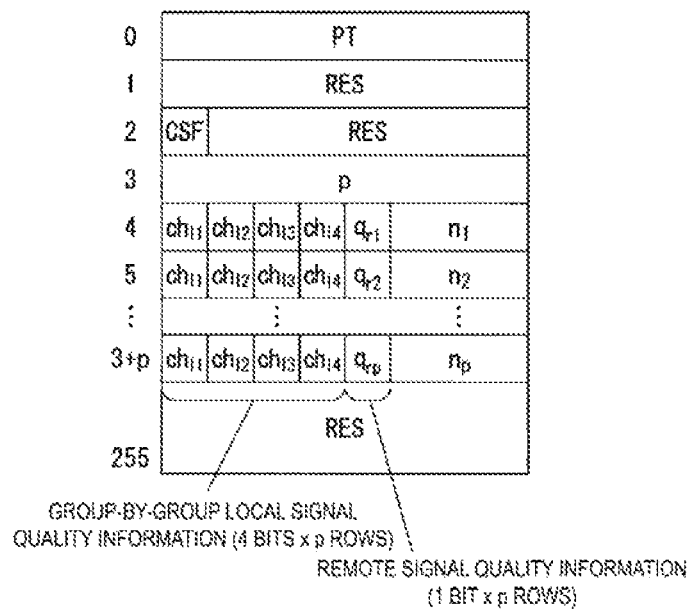
FIG. 12 is a diagram illustrating the PSI field according to the second embodiment.

FIG. 12 is a diagram illustrating an example in which each of the fourth to 3+p-th rows in the PSI field is configured with one bit $q_{rp}$ of remote signal quality information in addition to the four bits $ch_{11}$, $ch_{12}$, $ch_{13}$, and $ch_{14}$ of group-by-group local signal quality information described above. Here, the remote signal quality information is assumed to be a logical sum of the group-by-group local signal quality information transmitted to the source of the group-by-group local signal quality information by the transponder 4 used as the destination and having received the group-by-group local signal quality information. Using the method 1 in FIG. 10 results in one unused bit in addition to four bits of group-by-group local signal quality information. By configuring this in the remote signal quality information, the correct arrival of the group-by-group local signal quality information at the destination can be confirmed.

Figure 13:
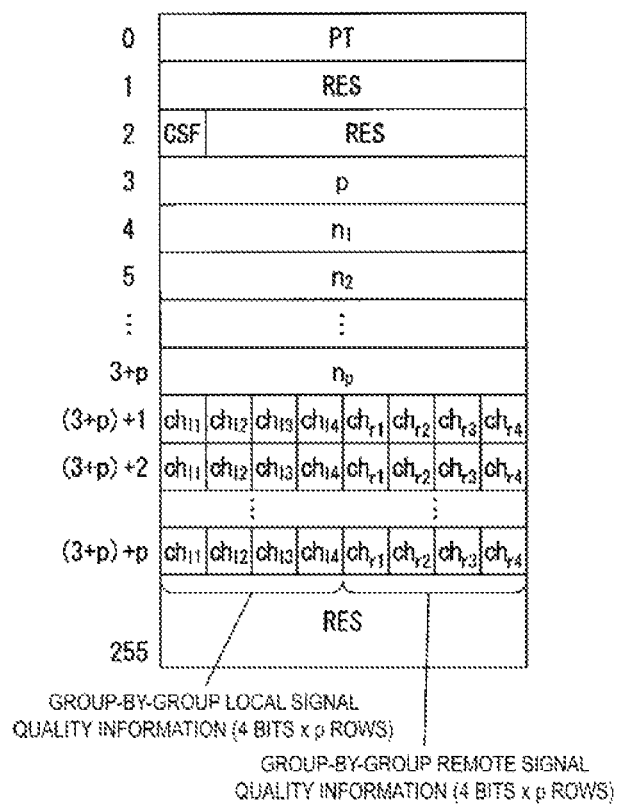
FIG. 13 is a diagram illustrating the PSI field according to the second embodiment.
Figure 14:
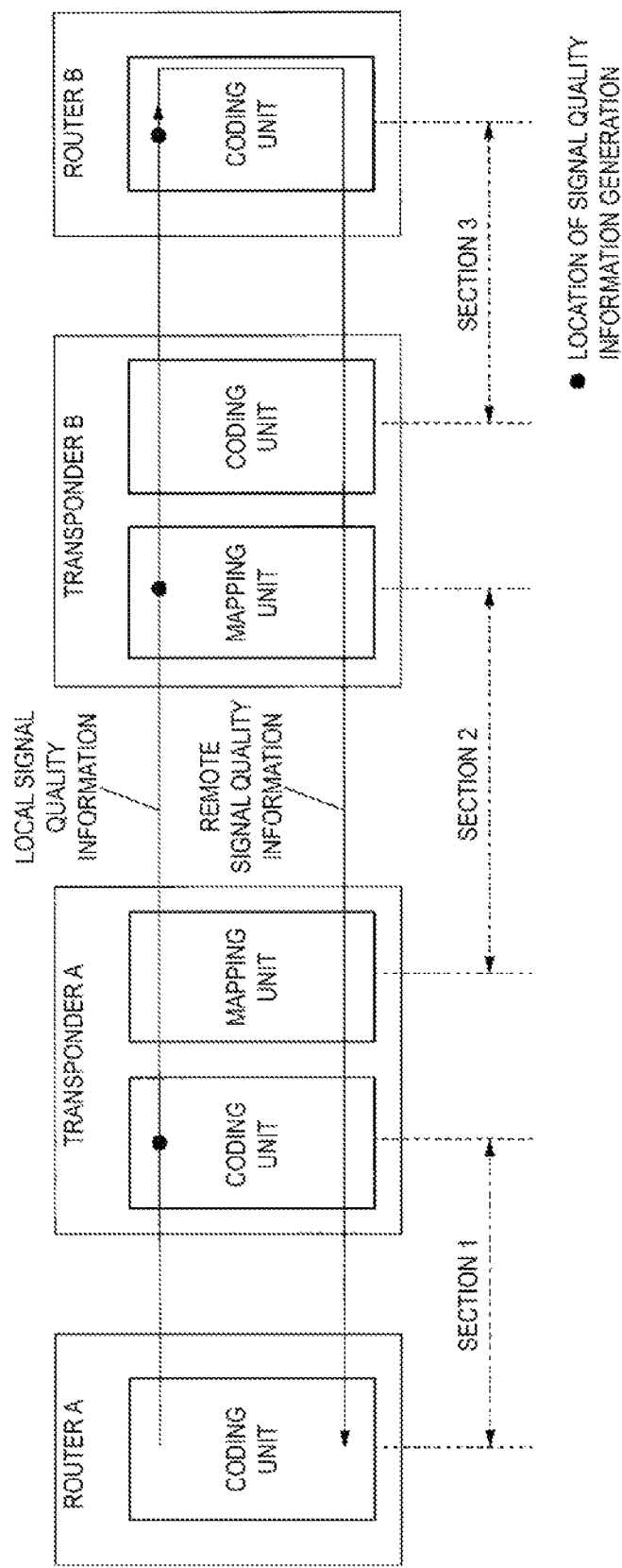
FIG. 14 is a diagram illustrating a known signal quality communication method.
Figure 15:
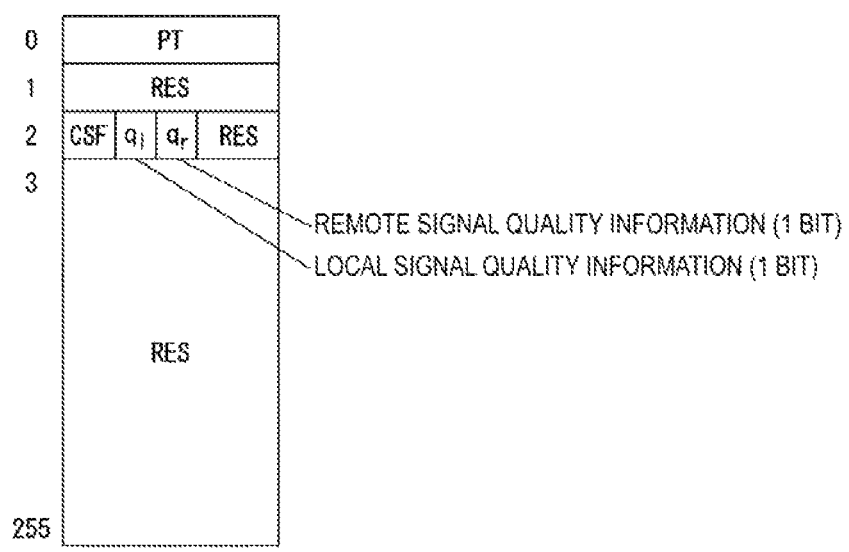
FIG. 15 is a diagram illustrating an example of a known storage location of signal quality information.

FIG. 13 is a diagram illustrating an example in which the (3+p)+1-th to (3+p)+p-th rows in the PSI field are used to configure the four bits $ch_{11}$, $ch_{12}$, $ch_{13}$, and $ch_{14}$ of group-by-group local signal quality information and the four bits $ch_{r1}$, $ch_{r2}$, $ch_{r3}$, and $ch_{r4}$ of group-by-group remote signal quality information. In other words, $chi_{rj}$ is configured with the signal quality information regarding the j-th (j is an integer of 1 or greater and 4 or smaller) of the four units in the downlink communication. This method allows confirmation of the correct arrival of the signal quality information at the destination in units of groups, while using the RES region to ensure compatibility with the known method.

In the embodiment described above, the PSI field is configured with the local signal quality information, the remote signal quality information, the group-by-group local signal quality information, and the group-by-group remote signal quality information. However, these pieces of information may be configured in any other field.

According to the present embodiment, when transmission on a certain communication path is performed by a relay operation between a plurality of communication schemes, the signal quality information generated in accordance with a communication scheme at a relay source is transmitted using transmission blocks of a communication scheme at a relay destination. This allows the signal quality degradation state in one or more communication paths and the section of the one or more communication paths in which the degradation has occurred to be determined at an end point of the communication paths.

Some or all of the functions of the router 2, the transponder 3, the transponder 4, and the router 5 may be implemented by using hardware such as an application specific integrated circuit (ASIC), a programmable logic device (PLD), or a field programmable gate array (FPGA). The router 2, the transponder 3, the transponder 4, and the router 5 may include a Central Processing Unit (CPU), a memory, an auxiliary storage device, and the like connected through a bus and execute programs to implement some of the functions described above. In this case, the programs may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. The program may be transmitted over an electrical communication line.

According to the above-described embodiment, the communication system transmits relay data by a communication path including a plurality of sections in which different communication schemes are used. The communication system is provided with a relay communication device between a first section corresponding to one section of the communication path and a second section corresponding to another section adjacent to the first section. The relay communication device converts a first communication scheme used in the first section into a second communication scheme used in the second section. The relay communication device includes a receiving unit a relaying unit. The receiving unit receives the relay data from the first section by using a frame of the first communication scheme. The relaying unit configures signal quality information representing signal quality in a frame of a second communication scheme used to transmit the relay data to a relay destination, and outputs the frame to the second section. The signal quality information representing the signal quality is the signal quality information representing the signal quality calculated for a physical link (transmission path) in each section through which the relay data is transmitted before arriving at the relay communication device. A receiving end node of the communication path can uniquely identify a generated section from the received signal quality information. For example, in a case where the relay communication device corresponds to the transponders 3, in the uplink, the receiving unit corresponds to the coding unit 31, the relaying unit corresponds to the relay processing unit 32 and the mapping unit 33, the first communication scheme corresponds to FlexE, and the second communication scheme corresponds to OTN. For example, in a case where the relay communication device corresponds to the transponders 4, in the uplink, the receiving unit corresponds to the mapping unit 41, the relaying unit corresponds to the relay processing unit 42 and the coding unit 43, the first communication scheme corresponds to OTN, and the second communication scheme corresponds to FlexE.

The relaying unit configures the correspondence between the physical link and the signal quality information calculated for the physical link in a frame of the second communication scheme in a format in which the correspondence is uniquely identifiable. For example, in a case where the second communication scheme is OTN, the relaying unit configures the signal quality information regarding the physical link in a part of the PSI field of OPU. Then, in a case where the first communication scheme is FlexE, the relaying unit configures the signal quality information regarding the physical link in the first section, in an unused bit region included in block count configuration regions corresponding to bit regions in the PSI field each assigned to the physical link and configured with the number of in-use transmission blocks in the physical link.

Note that the information regarding the number of in-use transmission blocks that is configured in the block count configuration region may be information encoded to increase the Hamming distance. The block count configuration region may partially include a bit region for ensuring compatibility with a known method. The block count configuration region may partially include a region in which parity computed for the block count configuration region is configured.

The embodiments of the present invention have been described above in detail with reference to the drawings. However, specific configurations are not limited to those embodiments, and include any design or the like within the scope not departing from the gist of the present invention.

INDUSTRIAL APPLICABILITY

The embodiments of the present invention are applicable to a communication system that performs relay by using a plurality of communication schemes.

REFERENCE SIGNS LIST

1 . . . Communication system
2 . . . Router
3 . . . Transponder
4 . . . Transponder
5 . . . Router
21 . . . Demultiplexing unit
22-1 to 22-*p* . . . Coding unit
31-1 to 31-*p* . . . Coding unit
32 . . . Relay processing unit
33 . . . Mapping unit
41 . . . Mapping unit
42 . . . Relay processing unit
43-1 to 43-*p* . . . Coding unit
51 . . . Coding unit
52 . . . Demultiplexing unit

The invention claimed is:

1. A signal quality information notification method in a communication system for transmitting relay data through a communication path including a plurality of sections in which different communication schemes are used, the signal quality information notification method comprising:
by a relay communication device provided between a first section corresponding to one of the plurality of sections and a second section corresponding to another of the plurality of sections located adjacent to the first section,
receiving the relay data from the first section through a frame of a first communication scheme; and
performing relaying including configuring, in a frame of a second communication scheme used to transmit the relay data to a relay destination, signal quality information representing signal quality calculated for a physical link in each of the sections through which the relay data is transmitted before arriving at the relay communication device, and outputting the frame of the second communication scheme to the second section,
wherein, in the performing relaying, wherein the frame of the second communication scheme includes one bit of signal quality information for each of the physical links through which the relay data is transmitted before arriving at the relay communication device.

2. The signal quality information notification method according to claim 1, wherein, in a case where the second communication scheme is an Optical Transport Network (OTN), in the performing relaying, the signal quality information regarding the physical link is configured in a part of a Payload Structure Identifier (PSI) field of an Optical-channel Payload Unit (OPU).

3. The signal quality information notification method according to claim 2, wherein,
in a case where the first communication scheme is a Flex Ethernet (trade name, FlexE), in the performing relaying, the signal quality information regarding the physical link in the first section is configured in an unused bit region included in block count configuration regions corresponding to bit regions in the PSI field each assigned to the physical link and configured with a number of in-use transmission blocks in the physical link.

4. The signal quality information notification method according to claim 3, wherein
the information regarding the number of in-use transmission blocks that is configured in the block count configuration region is encoded to increase a Hamming distance.

5. The signal quality information notification method according to claim 3, wherein
the block count configuration region partially includes a bit region to ensure compatibility with a known scheme.

6. The signal quality information notification method according to claim 3, wherein
the block count configuration region partially includes a region in which parity computed for the block count configuration region is configured.

7. A relay communication device in a communication system for transmitting relay data through a communication path including a plurality of sections in which different communication schemes are used, the relay communication device being provided between a first section corresponding to one of the plurality of sections and a second section corresponding to another of the plurality of sections located adjacent to the first section, the relay communication device comprising:
a processor; and
a storage medium having computer program instructions stored thereon, when executed by the processor, perform to:
receive the relay data from the first section through a frame of a first communication scheme; and
configure, in a frame of a second communication scheme used to transmit the relay data to a relay destination, signal quality information representing signal quality calculated for a physical link in each of the sections through which the relay data is transmitted before arriving at the relay communication device, and output the frame of the second communication scheme to the second section;
wherein the frame of the second communication scheme includes one bit of signal quality information for each of the physical links through which the relay data is transmitted before arriving at the relay communication device.

8. The relay communication device according to claim 7, wherein, in a case where the second communication scheme is an Optical Transport Network (OTN), in the performing relaying, the signal quality information regarding the physical link is configured in a part of a Payload Structure Identifier (PSI) field of an Optical-channel Payload Unit (OPU).

9. The relay communication device according to claim 8, wherein, in a case where the first communication scheme is a Flex Ethernet (trade name, FlexE), in the performing relaying, the signal quality information regarding the physical link in the first section is configured in an unused bit region included in block count configuration regions corresponding to bit regions in the PSI field each assigned to the physical link and configured with a number of in-use transmission blocks in the physical link.

10. The relay communication device according to claim 9, wherein the information regarding the number of in-use transmission blocks that is configured in the block count configuration region is encoded to increase a Hamming distance.

11. The relay communication device according to claim 9, wherein the block count configuration region partially includes a bit region to ensure compatibility with a known scheme.

12. The relay communication device according to claim 9, wherein the block count configuration region partially includes a region in which parity computed for the block count configuration region is configured.

13. The relay communication device according to claim 7 wherein the frame of the second communication scheme is configured, for each physical link, with one bit for storing signal quality information.

14. A signal quality information notification method in a communication system for transmitting relay data through a communication path including a plurality of sections in which different communication schemes are used, the signal quality information notification method comprising:
by a relay communication device provided between a first section corresponding to one of the plurality of sections and a second section corresponding to another of the plurality of sections located adjacent to the first section,
receiving the relay data from the first section through a frame of a first communication scheme; and
performing relaying including configuring, in a frame of a second communication scheme used to transmit the relay data to a relay destination, signal quality information representing signal quality calculated for a physical link in each of the sections through which the relay data is transmitted before arriving at the relay communication device, and outputting the frame of the second communication scheme to the second section,
wherein the signal quality information includes local signal quality information and remote signal quality information, each of the local signal quality information and the remote signal quality information includes p bits, where p corresponds to a number of physical links.

15. The signal quality information notification method according to claim 14, wherein,
in a case where the second communication scheme is an Optical Transport Network (OTN), in the performing relaying, the signal quality information regarding the physical link is configured in a part of a Payload Structure Identifier (PSI) field of an Optical-channel Payload Unit (OPU).

16. The signal quality information notification method according to claim 15, wherein,
in a case where the first communication scheme is a Flex Ethernet (trade name, FlexE), in the performing relaying, the signal quality information regarding the physical link in the first section is configured in an unused bit region included in block count configuration regions corresponding to bit regions in the PSI field each assigned to the physical link and configured with a number of in-use transmission blocks in the physical link.

17. The signal quality information notification method according to claim 15, wherein the information regarding the number of in-use transmission blocks that is configured in the block count configuration region is encoded to increase a Hamming distance.

18. The signal quality information notification method according to claim 15, wherein the block count configuration region partially includes a bit region to ensure compatibility with a known scheme.

19. The signal quality information notification method according to claim 15, wherein the block count configuration region partially includes a region in which parity computed for the block count configuration region is configured.

* * * * *